(No Model.)
F. D. MERCER.
HORSE WHIPPING DEVICE.
No. 431,847. Patented July 8, 1890.
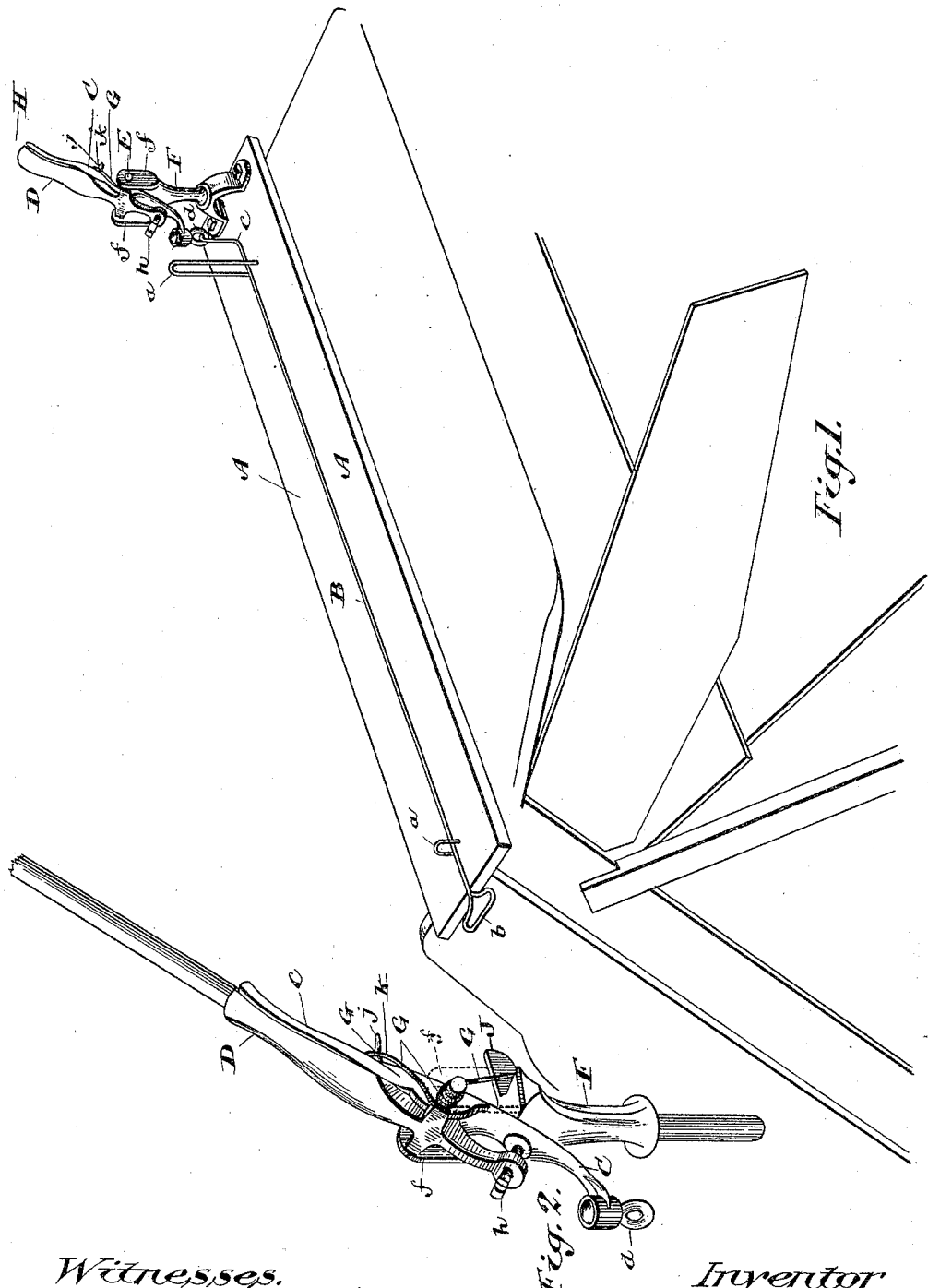
Witnesses.
F. B. Fetherstonhaugh.
W. G. McMillan.
Inventor
Frederick D. Mercer
By Donald C. Ridout &co
Attys

UNITED STATES PATENT OFFICE.

FREDERICK D. MERCER, OF ALLISTON, ONTARIO, CANADA.

HORSE-WHIPPING DEVICE.

SPECIFICATION forming part of Letters Patent No. 431,847, dated July 8, 1890.

Application filed October 9, 1889. Serial No. 326,459. (No model.)

*To all whom it may concern:*

Be it known that I, FREDERICK DUNCAN MERCER, manufacturer, of the village of Alliston, in the county of Simcoe, in the Province of Ontario, Canada, have invented a certain new and Improved Horse-Whipping Device, of which the following is a specification.

The object of the invention is to provide means by which a whip may be used conveniently without being removed from the socket; and it consists, essentially, of a whip-holder pivoted on a machine or vehicle and operated by a rod brought into proximity with the driver's seat, substantially as hereinafter more particularly explained.

Figure 1 is a perspective view of the whipping device in position. Fig. 2 is an enlarged perspective view of the whipping-device partly broken away.

Like letters of reference indicate similar parts in each figure.

In Fig. 1, A is part of a machine or vehicle. $a\ a$ are guides to direct the rod B, which operates the whipping-device. This rod B has at one end of it the handle $b$ and at the other end an elbow $c$, having an eye or ring, which is attached to an eye or ring in the end of the socket C. D is the upper jaw of the socket, and both jaws are pivoted on the spindle E, which has bearings $f\ f$ on the upright support F. The lower part of the upright support F is journaled securely to the machine or vehicle. The lower jaw, with the ring $d$, projects beyond the end of the upper jaw D, which has an adjusting-screw $h$, by means of which the whip can be securely fastened in the socket C.

In Fig. 2 is shown the spring G, which is designed to throw the socket, with the whip, into normal position after having been used in the operation of whipping. $j$ is a lug formed on the socket C, designed to meet the stop J, formed on the upright support F, when the operation of whipping is performed. By turning the elbow $c$ of the rod B to right or left and then pulling quickly either horse may be conveniently whipped.

While I prefer to pivot the whipping device on a swiveled upright support, as this arrangement enables me to adjust the whip-holder so as to use the whip on either horse, it will be seen that when the device is to be used on a single-horse machine or vehicle the swiveled support may be dispensed with, and the spring might also be dropped without destroying the entire usefulness of the device.

What I claim as my invention is—

1. A horse-whipping device having a support or frame, and a socket pivoted in said support, consisting of two jaws, a clamping-screw in one of the said jaws, and a spring on the pivot of the socket for retaining it in its normal position.

2. A horse-whipping device having a support or frame, a socket pivoted in said support and having an elbow, the rod connected to said elbow for moving the socket, and the spring for returning the socket to its normal position.

3. A horse-whipping device having a support or frame having a stop, a socket having a lug for abutting against the stop, a rod for moving the socket, and a spring for returning the same to its normal position.

4. A horse-whipping device having a support or frame, a stop on said frame, and a socket pivoted in said frame, having a lug abutting against the stop.

5. A horse-whipping device having a support or frame, a whip-socket consisting of two jaws pivoted in said frame, a screw in one of the jaws engaging the other jaw, and a spring for returning said socket to its normal position.

Toronto, September 28, 1889.

FREDERICK D. MERCER.

In presence of—
    CHARLES C. BALDWIN,
    DONALD CAMPBELL RIDOUT, Jr.